(12) United States Patent
Kim et al.

(10) Patent No.: US 9,640,814 B2
(45) Date of Patent: May 2, 2017

(54) DEVICE FOR ADJUSTING HOLLOW FIBER MEMBRANE DENSITY FOR HUMIDIFICATION DEVICE OF FUEL CELL

(71) Applicants: Hyundai Motor Company, Seoul (KR); Kia Motors Corporation, Seoul (KR)

(72) Inventors: Hyun Yoo Kim, Seoul (KR); Hyuck Roul Kwon, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 339 days.

(21) Appl. No.: 14/564,486

(22) Filed: Dec. 9, 2014

(65) Prior Publication Data
US 2016/0036075 A1    Feb. 4, 2016

(30) Foreign Application Priority Data

Jul. 31, 2014  (KR) .......................... 10-2014-0097868

(51) Int. Cl.
*H01M 8/04* (2016.01)
*H01M 8/04291* (2016.01)
(Continued)

(52) U.S. Cl.
CPC ......... *H01M 8/04291* (2013.01); *B60L 1/003* (2013.01); *B60L 11/1883* (2013.01); *B60L 11/1898* (2013.01); *H01M 8/04097* (2013.01); *H01M 8/04141* (2013.01); *H01M 8/04149* (2013.01); *H01M 8/04492* (2013.01); *B01D 63/02* (2013.01); *B01D 69/02* (2013.01); *H01M 8/045* (2013.01); *H01M 8/04507* (2013.01); *H01M 8/04514* (2013.01); *H01M 8/04522* (2013.01); *H01M 8/04529* (2013.01);
(Continued)

(58) Field of Classification Search
CPC ................. B01D 63/04; B01D 63/043; H01M 8/04492–8/04529
See application file for complete search history.

(56) References Cited

U.S. PATENT DOCUMENTS 9,314,744 B2 * 4/2016 Kim .................... B01D 63/021
2005/0110172 A1 * 5/2005 Tanaka .................. B01D 63/02
                                                                        261/104

(Continued)

FOREIGN PATENT DOCUMENTS

| JP | 2005-034715 A | 2/2005 |
| JP | 2007-216176 A | 8/2007 |

(Continued)

*Primary Examiner* — Scott J Chimielecki
(74) *Attorney, Agent, or Firm* — Mintz Levin Cohn Ferris Glovsky and Popeo, P.C.; Peter F. Corless

(57) ABSTRACT

Disclosed is a device for adjusting humidification gas of a membrane humidification device of a fuel cell. In particular, the device is adapted to induce changes in differential pressure and velocity of the wet air for each division module and to improve the humidification efficiency by sequentially mounting the division modules divided into various numbers to the interior of a housing of the membrane humidification device, thereby adjusting the density of the hollow fiber membrane filled in each division module.

16 Claims, 8 Drawing Sheets

(51) Int. Cl.
*H01M 8/04492* (2016.01)
*H01M 8/04089* (2016.01)
*H01M 8/04119* (2016.01)
*B60L 1/00* (2006.01)
*B60L 11/18* (2006.01)
*B01D 63/02* (2006.01)
*B01D 69/02* (2006.01)

(52) U.S. Cl.
CPC .......... *H01M 2250/20* (2013.01); *Y02T 90/32* (2013.01); *Y02T 90/34* (2013.01)

(56) References Cited

U.S. PATENT DOCUMENTS

| | | | | |
|---|---|---|---|---|
| 2005/0116365 A1* | 6/2005 | Yazawa | ................... | B01D 53/22 261/104 |
| 2005/0241482 A1* | 11/2005 | Berger | ................. | B01D 53/268 96/8 |
| 2008/0237902 A1* | 10/2008 | Nagumo | ................. | B01D 53/22 261/104 |
| 2009/0226784 A1* | 9/2009 | Kim | ....................... | B01D 63/02 429/413 |
| 2011/0000842 A1* | 1/2011 | Takagi | ................. | B01D 63/021 210/321.6 |
| 2012/0231357 A1* | 9/2012 | Kim | ................... | H01M 8/04149 429/414 |
| 2012/0270120 A1* | 10/2012 | Kim | ................... | H01M 8/04141 429/413 |
| 2013/0065140 A1* | 3/2013 | Kim | ....................... | B01D 63/04 429/413 |
| 2013/0137005 A1* | 5/2013 | Kim | ................... | H01M 8/04141 429/414 |
| 2013/0149634 A1* | 6/2013 | Kim | ....................... | B01D 63/021 429/516 |
| 2014/0054804 A1* | 2/2014 | Kim | ................... | H01M 8/04149 261/100 |
| 2014/0186727 A1* | 7/2014 | Kim | ................... | H01M 8/04141 429/413 |
| 2015/0050572 A1* | 2/2015 | Usuda | ................... | B01D 63/02 429/413 |
| 2015/0107453 A1* | 4/2015 | Usuda | ................... | B01D 63/02 96/8 |
| 2015/0188162 A1* | 7/2015 | Lee | ....................... | B01D 63/043 261/100 |
| 2015/0367279 A1* | 12/2015 | Kim | ....................... | B01D 63/02 210/500.23 |
| 2016/0079616 A1* | 3/2016 | Lee | ................... | H01M 8/04149 210/321.88 |

FOREIGN PATENT DOCUMENTS

| | | |
|---|---|---|
| KP | 10-2012-0102988 A | 9/2012 |
| KP | 10-2013-0029301 A | 3/2013 |
| KR | 10-2003-0042640 A | 6/2003 |
| WO | 2011/122822 A2 | 10/2011 |

\* cited by examiner

DEVICE FOR ADJUSTING HOLLOW FIBER MEMBRANE DENSITY FOR HUMIDIFICATION DEVICE OF FUEL CELL

CROSS-REFERENCE TO RELATED APPLICATION

This application claims under 35 U.S.C. §119(a) the benefit of Korean Patent Application No. 10-2014-0097868 filed on Jul. 31, 2014, the entire contents of which are incorporated herein by reference.

TECHNICAL FIELD

The present invention relates to a device for adjusting humidification gas for a membrane humidification device of a fuel cell. Particularly, the device for adjusting a hollow fiber membrane density for a membrane humidification device of the fuel cell may improve humidification efficiency by sequentially mounting division modules divided into different numbers to the interior of a housing of the membrane humidification device, such that the density of a hollow fiber membrane filled in each division module may be adjusted.

BACKGROUND

For efficient operation of the fuel cell, humidification of the electrolyte in the fuel cell may be essential. As a humidification device, a humidification device may operate by exchanging moisture between an exhaust gas as a wet gas discharged from the fuel cell and a dry gas supplied from the outside air.

In particular, as the humidification device used in the fuel cell, a compact humidification device having a low electric power consumption and a small installation space may be required. Accordingly, among several types such as a ultrasonic humidification, a steam humidification, and an evaporation humidification, a humidification device using a hollow fiber membrane may be frequently used in the fuel cell. For example, as illustrated in accompanying FIG. 7, a membrane humidifier 100 and an air blower 202 are included in an air supply system that supplies oxygen or air to a fuel cell stack.

As such, the outside dry air is supplied into the hollow fiber membrane of the membrane humidifier 100 by a suction operation of an air blower 202, and the exhaust gas or wet air discharged from a fuel cell stack 200 passes through the membrane humidifier 100. The moisture contained in the exhaust gas at this time may penetrate into the hollow fiber membrane, and thus, the dry air may be humidified.

As shown in FIGS. 8 and 9, a configuration and an operation of the conventional membrane humidifier will be described in more detail below.

As illustrated in FIGS. 8 and 9, the conventional membrane humidifier 100 includes a housing 101, and the housing 101 is formed with a supply port 102 for introducing the dry air, and an outlet 103 for discharging the humidified dry air. In addition, a hollow fiber membrane 106 bundle in which a plurality of hollow fiber membranes 106 are densely packed may be provided inside the housing 101.

In addition, in the housing 101, an inlet 104 for inflow of the wet air discharged from the fuel cell stack is formed at a first side, and an outlet 105 for discharge of the wet air is formed at a second side which is opposite to the first side.

In the operation of the membrane humidifier using the hollow fiber membrane having the above configuration, when the exhaust gas discharged from the fuel cell stack after the reaction or the wet air is supplied toward the bundle of the hollow fiber membrane 106 from the inlet 104 of the housing 101, moisture in the wet air may be separated by capillary action of each hollow fiber membrane 106 and the separated moisture may be condensed while passing through the capillary of the hollow fiber membrane 106 and move into the hollow fiber membrane 106.

Subsequently, the wet air from which the moisture is separated may move along the outside of the hollow fiber membranes 106, and thus, the wet air may be discharged through the outlet 105 of the housing 101.

Meanwhile, in the hollow fiber membrane having the above configuration, the ambient air or the dry air is supplied through the supply port 102 of the housing 101 by driving of the air blower, and the dry air supplied through the supply port 102 moves through the interior of the hollow fiber membrane 106. Since moisture separated from the wet air may readily move to the interior of the hollow fiber membrane 106 at this time, the dry air may be humidified by the moisture, and the humidified dry air may be supplied to an air electrode of the fuel cell stack through the outlet 103.

However, since the hollow fiber membrane 106 bundle is formed such that a plurality of hollow fiber membranes 106 are densely disposed, the wet air may not be introduced into the hollow fiber membrane through the inlet 104. Moreover, since the diffusion speed of the wet air through the hollow fiber membrane is substantially reduced, the wet air may not penetrate into the interior of the hollow fiber membrane.

In particular, within the housing 101, the wet air passing through the outside of the hollow fiber membrane 106 bundle may not smoothly penetrate into a central part of the hollow fiber membrane 106 bundle indicated by a hidden lines in FIG. 9 inside the housing 101, and may flow mostly around the hollow fiber membrane on the edge side. As consequence, the humidification efficiency of the dry air may be reduced.

As such, in the related arts, a membrane humidifier for a fuel cell and application thereof have been developed to improve the humidification efficiency by installing a removable cartridge type internal division module inside the housing of the membrane humidifier and by allowing the wet air to uniformly penetrate to the central part of the hollow fiber membrane bundle through a wet air inlet aperture formed in each of the internal division modules.

However, since the density of the hollow fiber membranes arranged along a length direction of the housing of the membrane humidifier is uniformly arranged, changes in flow velocity and differential pressure of the wet air may not be induced, and humidification effect may not be sufficiently obtained.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides technical solutions to above mentioned technical difficulties in the related arts. Accordingly, a device for adjusting a hollow fiber membrane density for a membrane humidification device of a fuel cell is provided. In particular, the device may induce changes in differential pressure and velocity of the wet air for each division module by sequentially mounting division modules divided into different numbers to the interior of a housing of the membrane humidification device such that the hollow fiber membrane filled in each division module may be diversely adjust the density in the length direction thereof, thereby improving the humidification efficiency.

In one aspect, the present invention provides a device for adjusting a hollow fiber membrane density for a membrane humidification device of a fuel cell. The device may include: a hollow housing in which a dry air supply port and a discharge port for discharging the humidified dry air are formed on both sides, a wet air inlet is formed at a first end portion, and a wet air outlet is formed at a second other end portion; a plurality of division modules that contact with the wet air and are mounted to an interior of the housing; and a hollow fiber membrane bundle disposed inside each division module. Particularly, the division modules may be fixedly mounted to an inner space of a wet air inlet side of the housing, an inner space of a wet air outlet side, and a space between the wet air inlet and outlet and each division module may be divided into various numbers of sections.

The division modules may be constituted by a first division module that is divided into two sections and is mounted to the interior of the wet air inlet side of the housing; a second division module that is divided into four sections and is mounted to a space between the wet air inlet and outlet of the housing; and a third division module that is divided into six sections and is mounted to the interior of the wet air outlet side of the housing.

In addition, in above configuration of the division module, the first, the second, and the third division modules may have a cross-sectional shape among polygonal cross-sectional shapes, while a structure may be open in a lateral direction such that the hollow fiber membranes having a bundle may form a pass.

Moreover, in the configuration of the division module, a wet air induction aperture may be formed through four-side wall surfaces of the first division module and the third division module.

In an exemplary embodiment, the first division module may be provided as a hollow case structure having a semi-circular cross-section in which a circle may be laterally bisected; the second division module may be provided as a hollow case structure in which a circle may be divided into four sections along a vertical direction and may be equally arranged along a lateral direction; and the third division module may be provided as a hollow case structure in which a circle may be divided into six sections along the vertical direction and may be equally arranged along the lateral direction.

In an exemplary embodiment, the first division module may be provided as a hollow case structure having a square cross-section in which a rectangle may be laterally bisected; the second division module may be provided as a hollow case structure in which a rectangle may be divided into four sections along the vertical direction and may be equally arranged along the lateral direction; and the third division module may be provided as a hollow case structure in which a rectangle may be divided into eight sections along the vertical direction and may be equally arranged along the lateral direction.

In an exemplary embodiment, the first division module may be provided as a hollow case structure having a semi-circular cross-section in which a circle may be laterally bisected; the second division module may be provided as a hollow case structure in which a circle may be divided into four sections along the vertical direction and may be equally arranged along the lateral direction; and the third division module may be provided as a hollow case structure in which a circle may be divided into six sections along the lateral direction and may be equally arranged along the vertical direction.

Alternatively, the division module may be constituted by a first division module that may be divided into two sections and may be mounted to the interior of the wet air inlet side of the housing; a second division module that may be divided into four sections and may be mounted in a space between the wet air inlet and outlet of the housing; and a third division module that may be divided into two sections and may be mounted to the interior of the wet air outlet of the housing.

In this configuration of the division module, the first, the second, and the third division modules may be adopted as one cross-sectional shape among the polygonal cross-sectional shapes, while having a structure that may be open in the lateral direction such that the hollow fiber membranes having a bundle may form a pass. In particular, a wet air induction aperture 114 may be formed through wall surfaces of four-sides of the first division module and the third division module.

In an exemplary embodiment, the first division module may be provided as a hollow case structure having a semi-circular cross-section in which a circle may be laterally bisected; the second division module may be provided as a hollow case structure in which a circle may be divided into four sections along the vertical direction and may be equally arranged along the lateral direction; and the third division module may be provided as a hollow case structure having a semi-circular cross-section in which a circle may be laterally bisected.

In an exemplary embodiment, the first division module may be provided as a hollow case structure having a square cross-section in which a rectangle may be laterally bisected; the second division module may be provided as a hollow case structure in which a rectangle may be divided into four or more sections along the vertical direction and may be equally arranged along the lateral direction; and the third division module may be provided as a hollow case structure having a square cross-section in which a rectangle may be laterally bisected.

In an exemplary embodiment, the first division module may be provided as a hollow case structure having a semi-circular cross-section in which a circle may be laterally bisected, the second division module may be provided as a hollow case structure in which a circle may be divided into four sections along the vertical direction and may be equally arranged along the lateral direction; and the third division module may be provided as a hollow case structure having a semi-circular cross-section in which a circle may be vertically bisected.

Meanwhile, a support step forming a joint groove such that one end portion of each division module is fastened in a fitting manner may be formed integrally on an inner-diameter surface of the housing.

Further provided are fuel cell systems that comprise a device for adjusting a hollow fiber membrane density for a membrane humidification device of the fuel cell system, as disclosed herein. Also provided are vehicles, including automotive vehicles, that comprise a fuel cell system and/or a device for adjusting a hollow fiber membrane density for a membrane humidification device of a fuel cell system, as disclosed herein.

According to various exemplary embodiments of the present invention, various advantages may be provided.

For example, by sequentially mounting the division modules divided into different numbers to the interior of the housing of the membrane humidification device, the density in the length direction of the hollow fiber membrane filled in each division module may be adjusted such that the density may be gradually increased. In addition, the density may be adjusted to be gradually increased and then decreased.

Moreover, by adjusting the density in the length direction of the hollow fiber membranes in a different manner, changes in the differential pressure and the speed of the wet air flowing around the hollow fiber membrane for each division module may be induced, thereby improving the humidification efficiency. Further, by allowing the wet air came out from the fuel cell stack after finishing the reaction to uniformly penetrate into the central part of the hollow fiber membrane bundle via a the wet air inlet apertures of each division module, the humidification efficiency of the dry air may be improved substantially.

BRIEF DESCRIPTION OF THE DRAWINGS

The above and other features of the present invention will now be described in detail with reference to various exemplary embodiments thereof illustrated the accompanying drawings which are given hereinbelow by way of illustration only, and thus are not limitative of the present invention, and wherein.

Figure 1:
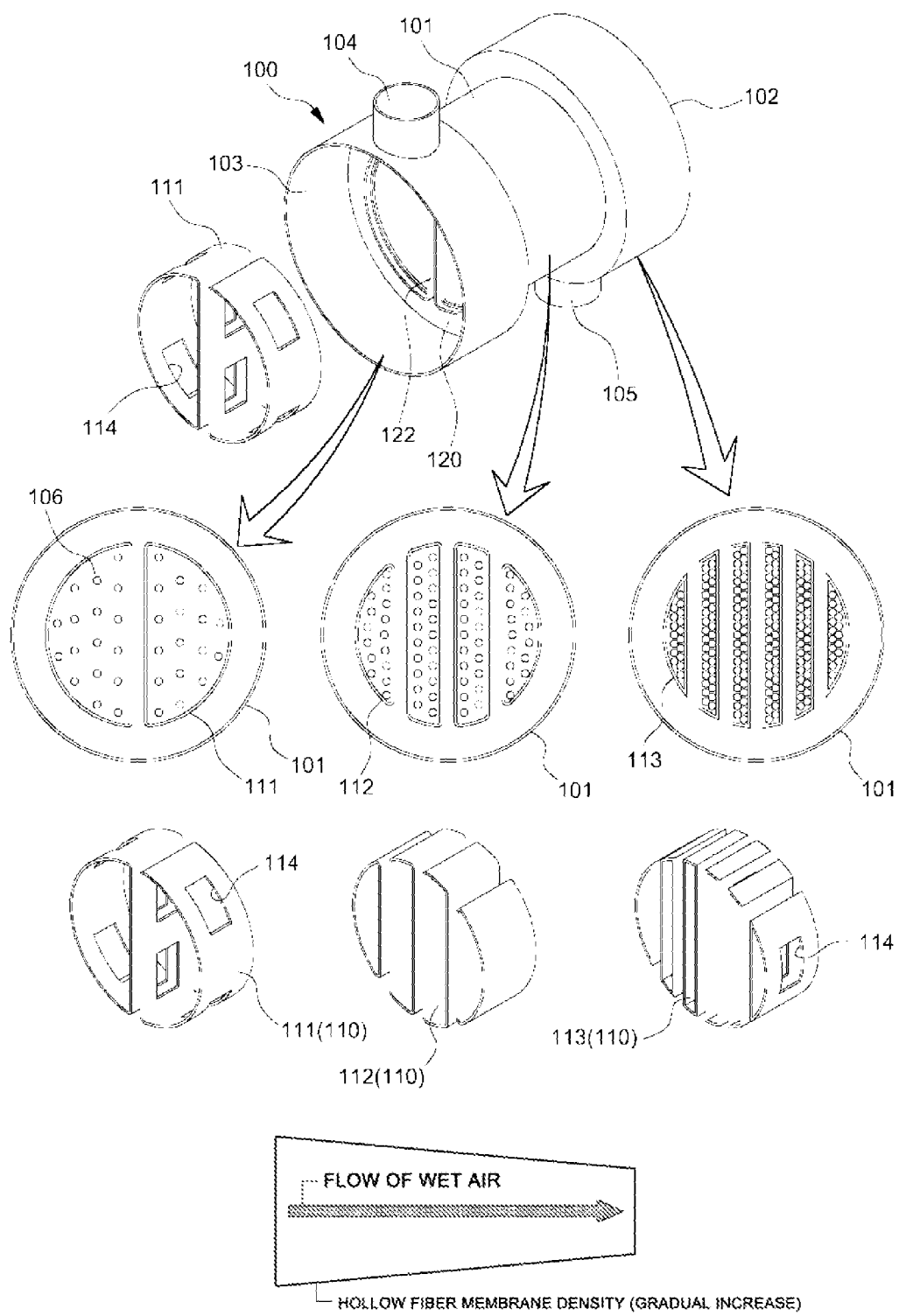
FIG. 1 illustrates an exemplary device for adjusting a hollow fiber membrane density for an exemplary membrane humidification device of a fuel cell according to a first exemplary embodiment of the present invention.

It should be understood that the appended drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several FIGS. of the drawing.

DETAILED DESCRIPTION

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter reference will now be made in detail to various exemplary embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, exemplary embodiments of the present invention will be described in detail below with reference to the accompanying drawings.

that the term "density" as used herein refers to an extent to which the hollow fiber membranes each having a minute diameter come into close contact with each other or is spaced apart from each other.

As shown in FIGS. 1 to 6, a housing 101 of a membrane humidifier 100 is provided as a hollow structure, a supply port 102 for introducing a dry air and an outlet 103 for discharging the dry air after humidification are formed on both sides, an inlet 104 for the inflow of the wet air discharged from the fuel cell stack is formed at a first side end portion, and an outlet 105 for the discharge of the wet air with water removed after humidification is formed at a second side which is opposite to the first side.

In particular, inside the housing 101, a plurality of division modules 110 may have any cross-sectional shape among polygonal cross-sectional shapes, while having a structure that may be open in the lateral direction such that a hollow fiber membrane 106 of a bundle may form passes and may be mounted to contact with the wet air.

Furthermore, in each of the plurality of division modules 110, sections may be divided by different numbers and may form one module and each division module 110 may be fixedly mounted in an inner space of a wet air inlet 104 side of a housing 101, in an inner space of a wet air outlet 103 side, and in a space between the wet air inlet 104 and the outlet 105, respectively.

Particularly, when dividing the polygon having the same cross-sectional area into several sections more than two sections as compared to the case of dividing it into two sections, since the space in which the hollow fiber membrane bundle provided internally is reduced, the density of the hollow fiber membranes may be diversely distributed according to each divided space.

For example, when the division module is divided into two sections, the inner space thereof and the spacing between the hollow fiber membranes may be wide, and thus the density may be low. When the division module is divided into two or more sections, the inner space thereof and the pacing between the hollow fiber membranes may decrease and be less than the division module divided into two sections, and thus the density may increase.

As such, by diversely adjusting the density in the length direction of the hollow fiber membranes in this way, changes in the differential pressure and the velocity rate of the wet air flowing around the hollow fiber membrane may be induced for each division module. Accordingly, the humidification efficiency of the dry air may be improved by allowing the wet air to uniformly penetrate to the central part of the hollow fiber membrane bundle in each division module.

Hereafter, a device for adjusting a hollow fiber membrane density for a membrane humidification device of a fuel cell according to the present invention will be described in more detail below through each example.

First Exemplary Embodiment

FIG. 1 illustrates an exemplary device for adjusting a hollow fiber membrane density for an exemplary membrane humidification device of a fuel cell according to a first example of the present invention.

As illustrated in FIG. 1, the division module 110 may be constituted by a first division module 111 that may be divided into two sections and may be mounted to the interior of the wet air inlet 104 side of the housing 101; a second division module 112 that may be divided into four sections and may be mounted in a space between the wet air inlet 104 and outlet 105 of the housing 101; and a third division module 113 that may be divided into six sections and may be mounted to the interior of the wet air outlet 105 side of the housing 101.

Particularly, on an inner-diameter surface of the housing 101, a support stage 120 may be integrally formed to form a joint groove 122 such that a first end portion of the division module 110 may be fitted therein. As such, the first end portion of the division module 110 including the first, second, and third division modules 111, 112, and 113 may be fixedly fitted to the joint groove 122 of the support stage 120 inside the housing 101.

Moreover, the first, second, and third division modules 111, 112, and 113 forming the division module 110 may be provided as a circular hollow case shape, while having a structure that may be open in the lateral direction such that the hollow fiber membranes 106 of the bundle type may pass.

Further, the first division module 111 may be provided as the hollow case structure having a semi-circular cross-section in which a circle may be laterally bisected; the second division module 112 may be provided as the hollow case structure in which a circle may be divided into four sections along the vertical direction and may be equally arranged along the lateral direction; and the third division module 113 may be provided as the hollow case structure in which a circle may be divided into six sections in the vertical circle and may be equally arranged along the lateral direction.

Wet air induction apertures 114 may be formed through four-side wall surfaces of the first division module 111 and the third division module 113, such that after the wet air discharged from the fuel cell stack may flow into the wet air inlet 104 of the housing 101, the wet air easily may flow toward the hollow fiber membrane of the division module.

Accordingly, since the first division module 111 of two-sections, the second division module 112 of four-sections, and the third division module 113 of six-sections are sequentially mounted from the interior of the wet air inlet 104 side of the housing 101 to the interior of the outlet 105 side, the density of the hollow fiber membranes may gradually increase.

As such, since the space in the first division module 111 is divided into two sections and the spacing between the hollow fiber membranes is wide, the density may be low. Since the space in the second division module 112 divided into four sections is less than the first division module and the spacing between the hollow fiber membranes is less than the first division module, the density may increase. Further, since the space in the third division module 113 is divided into six sections and the spacing between the hollow fiber membranes is less than the second division module 112, the density may further increase.

When the wet air discharged from the fuel cell stack flows into the wet air inlet 104 of the housing 101 and the wet air flows around the hollow fiber membranes 106 of the first to third division modules 111, 112, and 113, due to a change in density as described above, changes in the pressure difference and the velocity of the wet air may occur for each of the first to third division modules 111, 112, and 113, and eventually, and thus, the wet air may uniformly spread around each hollow fiber membrane.

In addition, when the dry air flows along the interior of the hollow fiber membrane 106, the moisture separated from the wet air by capillary action may move to interior of the hollow fiber membranes 106 to humidify the dry air.

According to the first example of the present invention, changes in differential pressure and velocity of the wet air flowing around the hollow fiber membranes may be induced for each of the first to third division modules 111, 112, and 113 by gradually increasing the density in the length direction of the hollow fiber membranes 106 for each of the first to third division modules 111, 112, and 113. Further, the humidification efficiency of the dry air may be improved by allowing the wet air in response to uniformly penetrate to the central part of the hollow fiber membrane bundle in each division module.

Second Exemplary Embodiment

Figure 2:
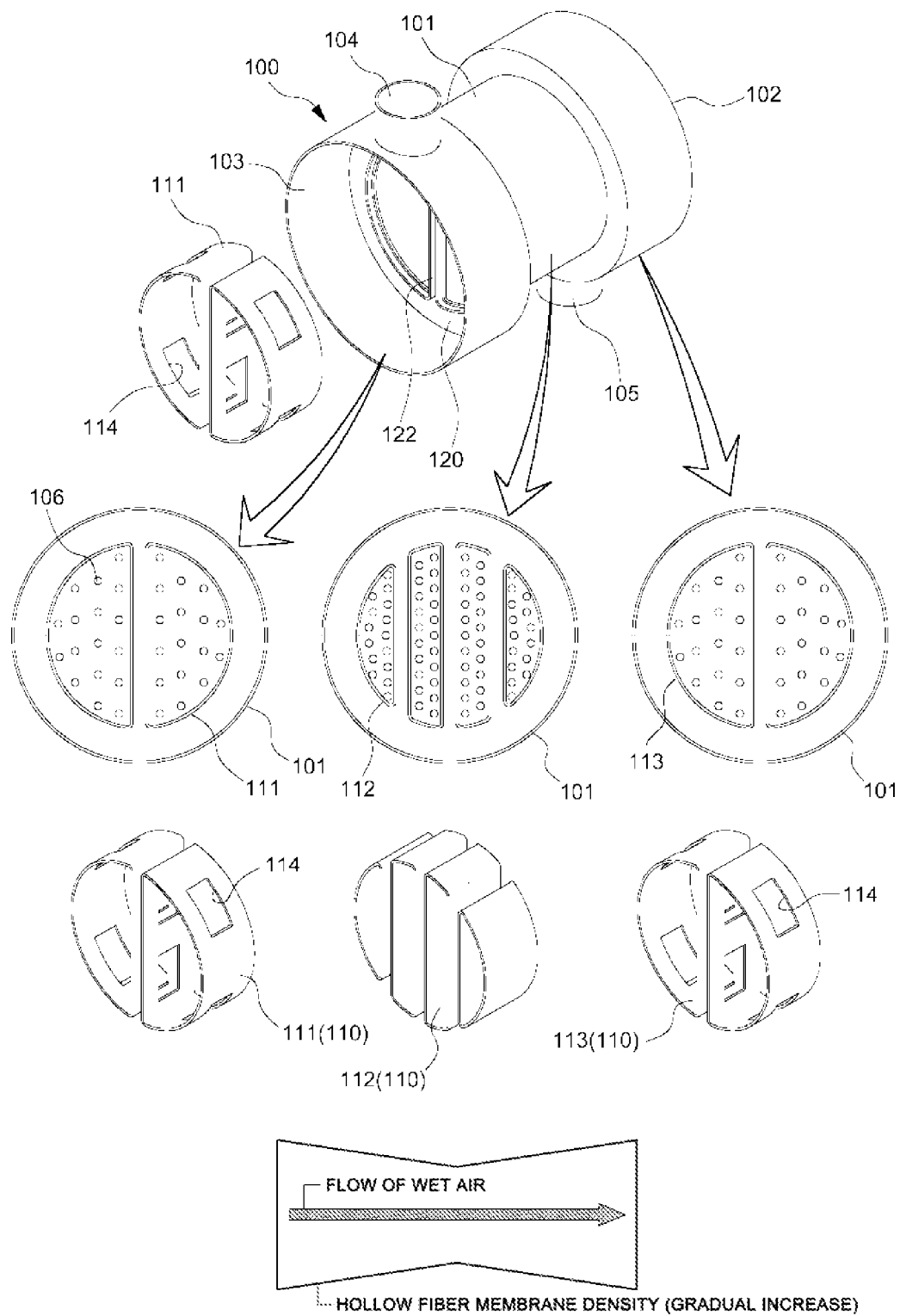
FIG. 2 illustrates an exemplary device for adjusting a hollow fiber membrane density for an exemplary membrane humidification device of a fuel cell according to a second exemplary embodiment of the present invention.

FIG. 2 illustrates an exemplary device for adjusting a hollow fiber membrane density for an exemplary membrane humidification device of a fuel cell according to a second example of the present invention.

As illustrated in FIG. 2, a division module 110 according to a second example of the present invention may be configured in the same manner as the division module of the above-described first exemplary embodiment; however, the third division module 113 may be configured to be same as the first division module 111.

Accordingly, the division module 110 according to the second exemplary embodiment of the present invention may be constituted by a first division module 111 that may be divided into two sections and may be mounted to the interior of the wet air inlet 104 side of the housing 101; a second division module 112 that may be divided into four sections and may be mounted to a space between the wet air inlet 104 and the outlet 105 of the housing 101; and a third division module 113 that may be divided into two sections and may be mounted to the interior of the wet air outlet 105 side of the housing 101.

The first division module 111 may be provided as a hollow case structure having a semi-circular cross-section in which a circle may be laterally bisected, the second division module 112 may be provided as a hollow case structure in which a circle may be divided into four sections along the vertical direction and may be equally arranged along the lateral direction, and the third division module 113 may be provided as a hollow case structure having a semi-circular cross-section in which a circle may be laterally bisected in the same manner as the first division module 111 in the second exemplary embodiment.

Thus, since the first division module 111 of two-sections, the second division module 112 of four-sections, and the third division module 113 of two-sections may be sequentially mounted from the interior of the wet air inlet 104 side of the housing 101 to the interior of the outlet 105 side, the density of the hollow fiber membranes may increase and subsequently decrease.

For example, since the space in the first division module 111 is divided into two sections, the spacing between the hollow fiber membranes is wide, the density may be low. In addition, since the space in the second division module 112 is divided into four sections and the spacing between the hollow fiber membranes is less than the first division module, the density may increase. In the third division module 113, the space is divided into two sections like the first division module 111, the density may decrease again.

According to the second exemplary embodiment of the present invention, changes in differential pressure and velocity of the wet air flowing around the hollow fiber membrane for each of the first to third division modules 111, 112, and 113 may be induced by increasing and then decreasing the density in the length direction of the hollow fiber membranes 106 for each of the first to third division modules 111, 112, and 113, and thus, the humidification efficiency of the dry air may be improved by allowing the wet air to uniformly penetrate to the central part of the hollow fiber membrane bundle in each division module.

Third Exemplary Embodiment

Figure 3:
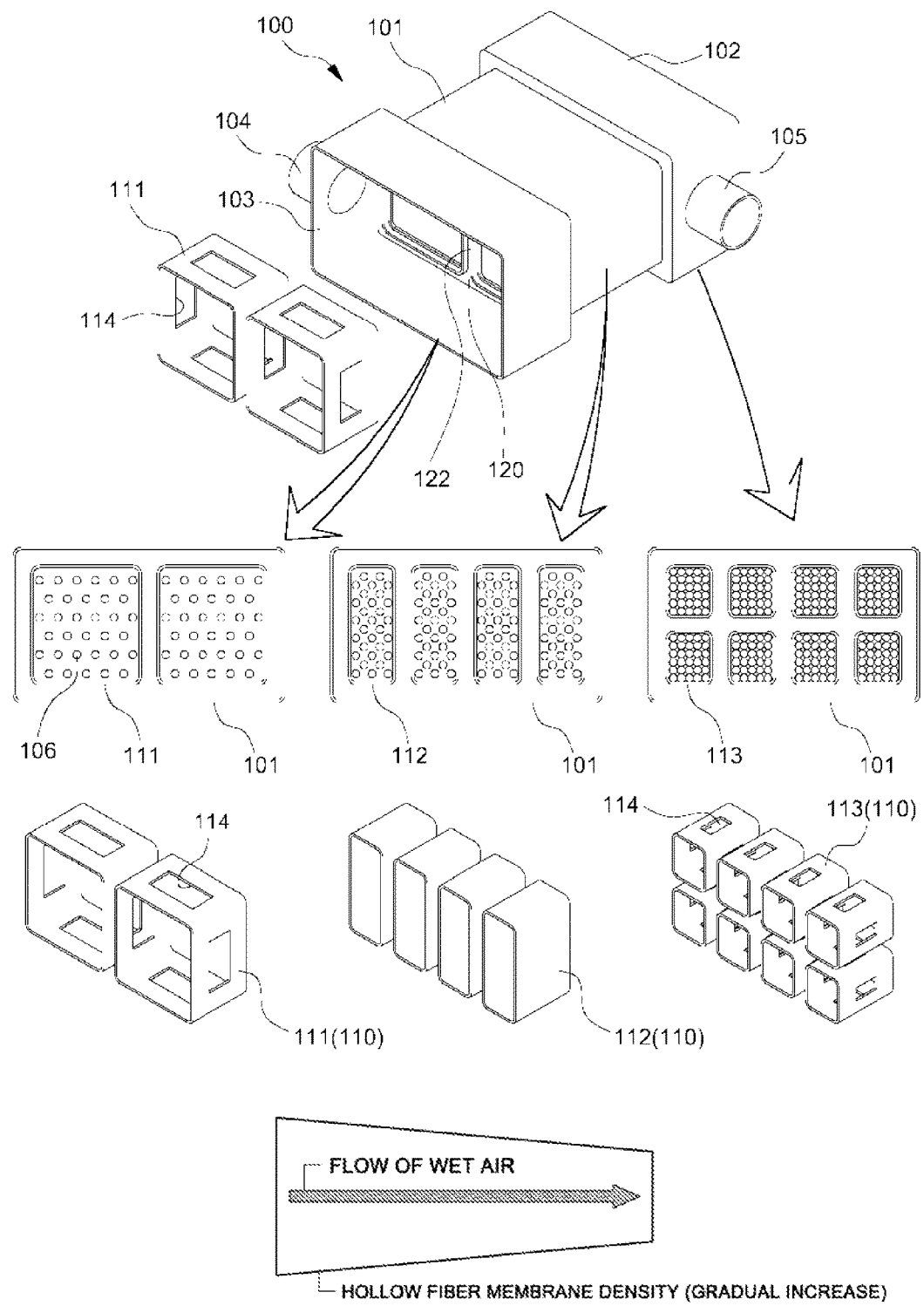
FIG. 3 illustrates an exemplary device for adjusting a hollow fiber membrane density for an exemplary membrane humidification device of a fuel cell according to a third exemplary embodiment of the present invention.

FIG. 3 illustrates an exemplary device for adjusting a hollow fiber membrane density for an exemplary membrane humidification device of a fuel cell according to a third exemplary embodiment of the present invention.

As illustrated in FIG. 3, a division module 110 according to the third example of the present invention may be configured in the same manner as the division module of the first exemplary embodiment as described above, but each division module may be provided as is a hollow case having a rectangular cross-section.

The first division module 111 may be provided as a hollow case structure having a square cross-section in which a rectangle may be laterally bisected; the second division module 112 may be provided as a hollow case structure in which a rectangle may be divided into four sections along the vertical direction and may be equally arranged along the lateral direction; and the third division module 113 may be provided as a hollow case structure in which a rectangle may be divided into eight sections along the vertical direction and may be equally arranged along the lateral direction.

Accordingly, since the space in the first division module 111 is divided into two sections and the spacing between the hollow fiber membranes is wide, the density may be low.

Since the space in the second division module 112 is divided into four sections and the spacing between the hollow fiber membranes is less than the first division module, the density may increase. Further, since the space in the third division module 113 is divided into eight sections and the spacing between the hollow fiber membranes is less than the second division module 112, the density may further increase.

According to the third example of the present invention, changes in differential pressure and velocity of the wet air flowing around the hollow fiber membrane for each of the first to third division modules 111, 112, and 113 may be induced by gradually increasing the density in the length direction of the hollow fiber membranes 106 for each of the first to third division modules 111, 112, and 113, and thus, the humidification efficiency of the dry air may be improved by allowing the wet air to uniformly penetrate to the central part of the hollow fiber membrane bundle in each division module.

Fourth Exemplary Embodiment

Figure 4:
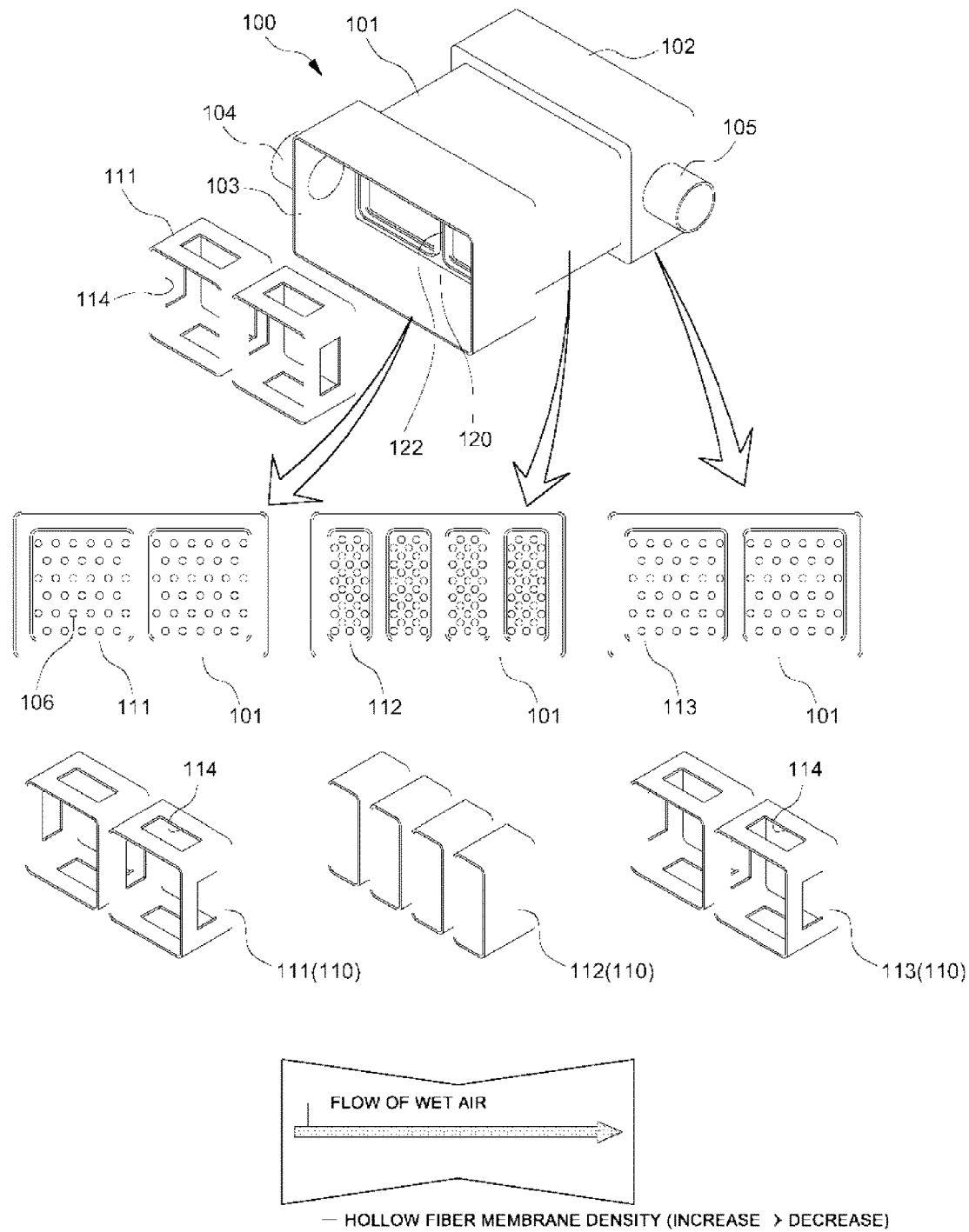
FIG. 4 illustrates an exemplary device for adjusting a hollow fiber membrane density for an exemplary membrane humidification device of a fuel cell according to a fourth exemplary embodiment of the present invention.

FIG. 4 illustrates an exemplary device for adjusting a hollow fiber membrane density for an exemplary membrane humidification device of a fuel cell according to a fourth exemplary embodiment of the present invention.

As illustrated in FIG. 4, a division module 110 according to the fourth example of the present invention may be configured in the same manner as the division module of the above-described third exemplary embodiment, but third division module 113 may be configured to be same as the first division module 111.

The first division module 111 may be provided as a hollow case structure having a square cross-section in which a rectangle may be laterally bisected, the second division module 112 may be provided as a hollow case structure in which a rectangle may be divided into four to eight sections along the vertical direction and may be equally arranged along the vertical and lateral direction, and the third division module 113 may be provided as a hollow case structure having a square cross-section in which a rectangle may be laterally bisected in the same way as the first division module 111.

Since the space in the first division module 111 is divided into two sections and the spacing between the hollow fiber membranes is wide, the density may be low. In addition, since the space in the second division module 112 is divided into four or more sections and the spacing between the hollow fiber membranes is less than the first division module, the density may increase. Further, since the space in the third division module 113 is divided into two sections as the first division module 111, the density may decrease again.

According to the fourth exemplary embodiment of the present invention, changes in differential pressure and velocity of the wet air flowing around the hollow fiber membrane for each of the first to third division modules 111, 112, and 113 may be induced by increasing and then decreasing the density in the length direction of the hollow fiber membranes 106 for each of the first to third division modules 111, 112, and 113, and thus, the humidification efficiency of the dry air may be improved by allowing the wet air to uniformly penetrate to the central part of the hollow fiber membrane bundle in each division module.

Fifth Exemplary Embodiment

Figure 5:
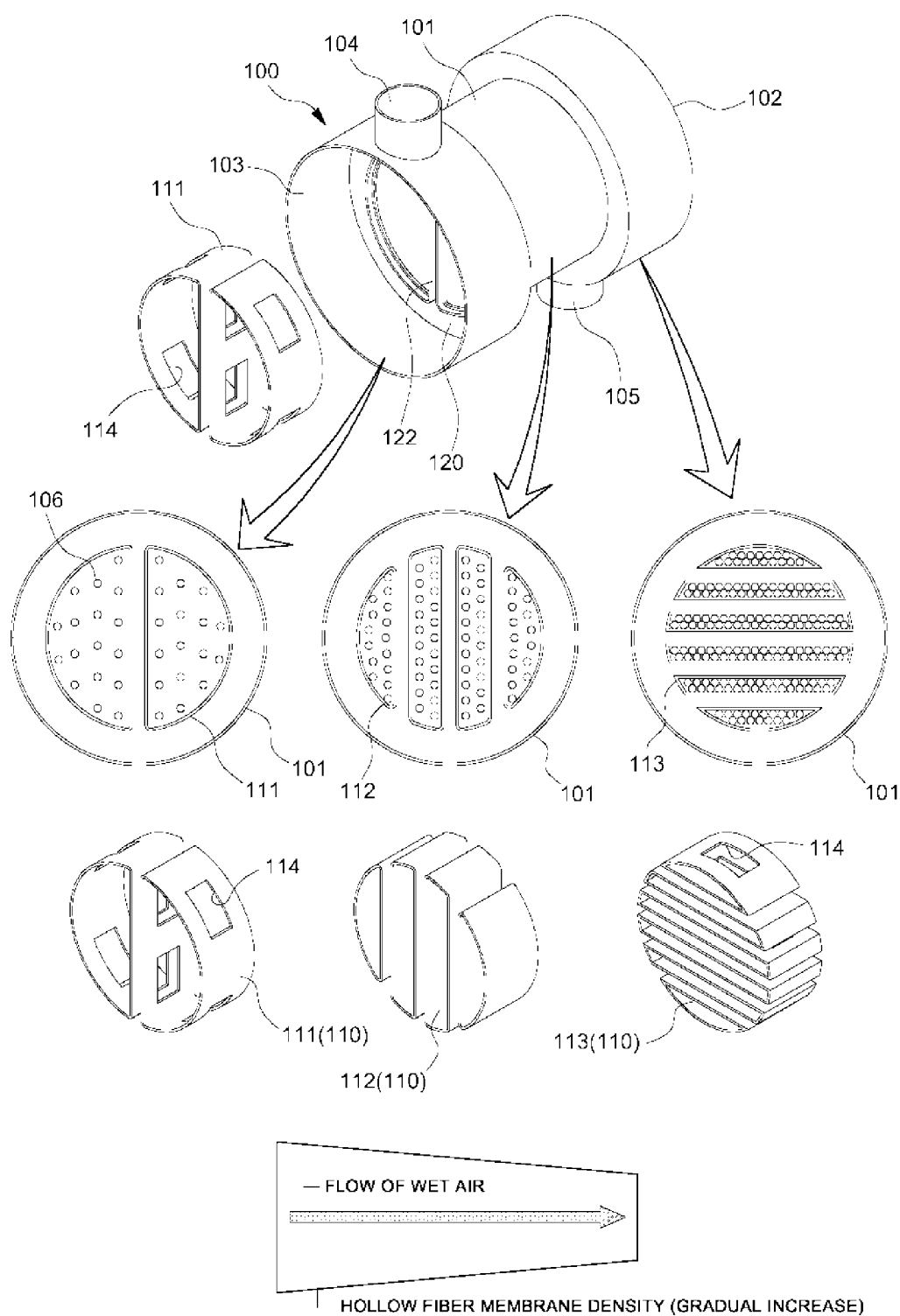
FIG. 5 illustrates an exemplary device for adjusting a hollow fiber membrane density for an exemplary membrane humidification device of a fuel cell according to a fifth exemplary embodiment of the present invention.

FIG. 5 illustrates an exemplary device for adjusting a hollow fiber membrane density for an exemplary membrane humidification device of a fuel cell according to a fifth exemplary embodiment of the present invention.

A division module 110 according to the fifth example of the present invention may be configured in the same manner as the division module of the above-described first example, but the third division module 113 may be arranged in a direction perpendicular to the first division module 111.

The first division module 111 may be provided as a hollow case structure having a semi-circular cross-section in which a circle may be laterally bisected, the second division module 112 may be provided as a hollow case structure in which a circle may be divided into four sections along the vertical direction and may be equally arranged along the lateral direction, and the third division module 113 may be provided as a hollow case structure in which a circle may be divided into six sections along the lateral direction and may be equally arranged along the vertical direction.

Since the space in the first division module 111 is divided into two sections and the spacing between the hollow fiber membranes is wide, the density may be low. In addition, since the space in the second division module 112 is divided into four sections and the spacing between the hollow fiber membranes is less than the first division module, the density may increase. Further, since the space in the third division module 113 is divided into six sections and the spacing between the hollow fiber membranes is less than the second division module 112, the density may further increase.

As described above, according to the fifth exemplary embodiment of the present invention, changes in differential pressure and velocity of the wet air flowing around the hollow fiber membranes for each of the first to third division module 111, 112, and 113 may be induced by gradually increasing the density in the length direction of the hollow fiber membranes 106 for each of the first to third division modules 111, 112, and 113. In particular, since the third division module 113 is arranged in a direction perpendicular to the first and second division modules 111 and 112, the direction of the flow of the wet air may be induced so as to change in the third division module 113, and thus, the humidification efficiency of the dry air may be improved by allowing the wet air to uniformly penetrate to the central part of the hollow fiber membrane bundle of each division module.

Sixth Exemplary Embodiment

Figure 6:
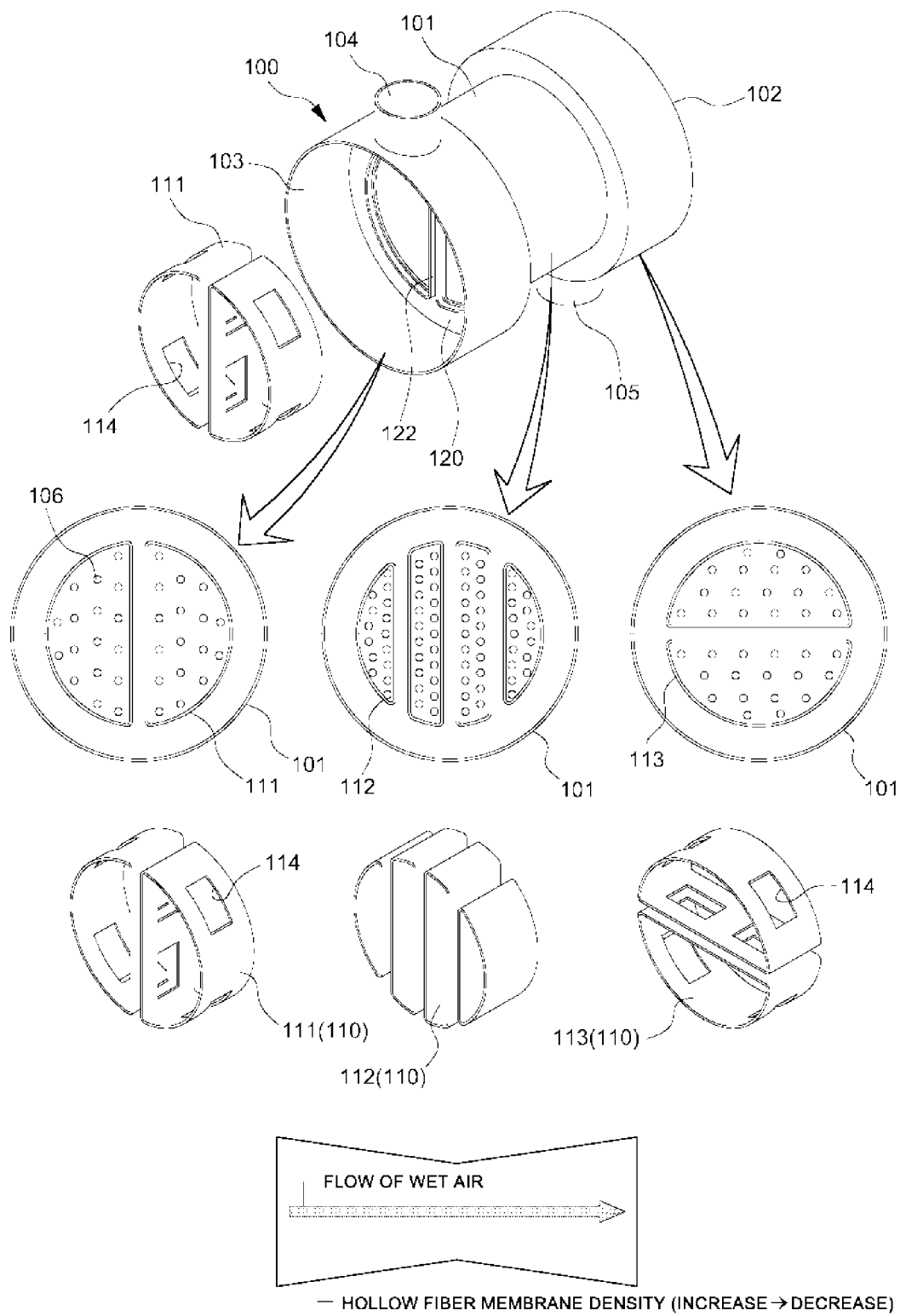
FIG. 6 illustrates an exemplary device for adjusting a hollow fiber membrane density for an exemplary membrane humidification device of a fuel cell according to a sixth exemplary embodiment of the present invention.
Figure 7:
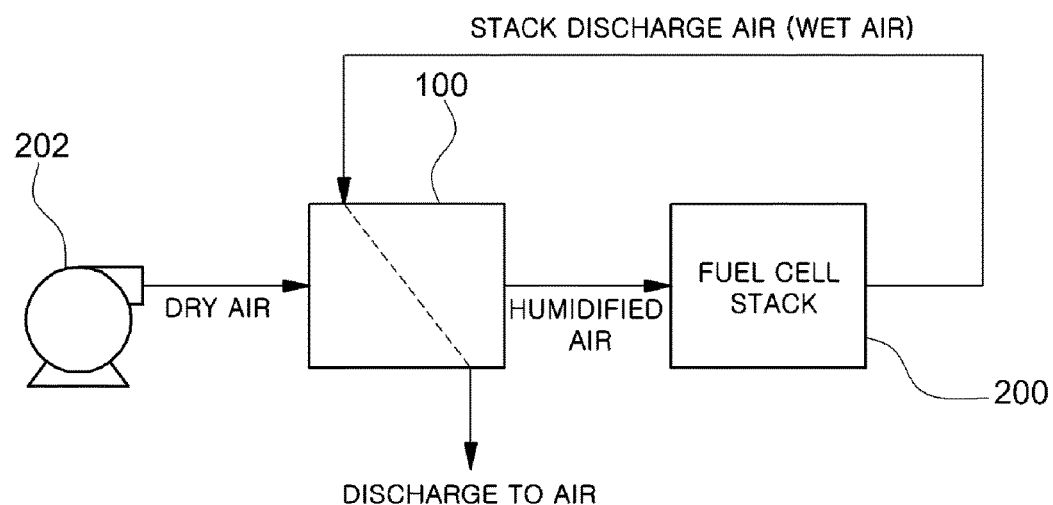
FIG. 7 illustrates an exemplary configuration of an exemplary air supply system for a fuel cell.
Figure 8:
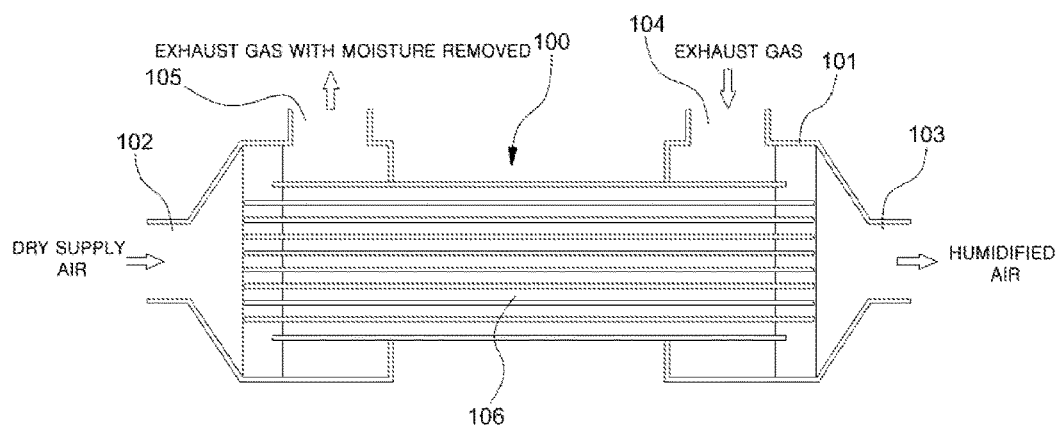
FIGS. 8 and 9 illustrate an exemplary configuration and an operating principle of a conventional membrane humidification device in the related arts.
Figure 9:
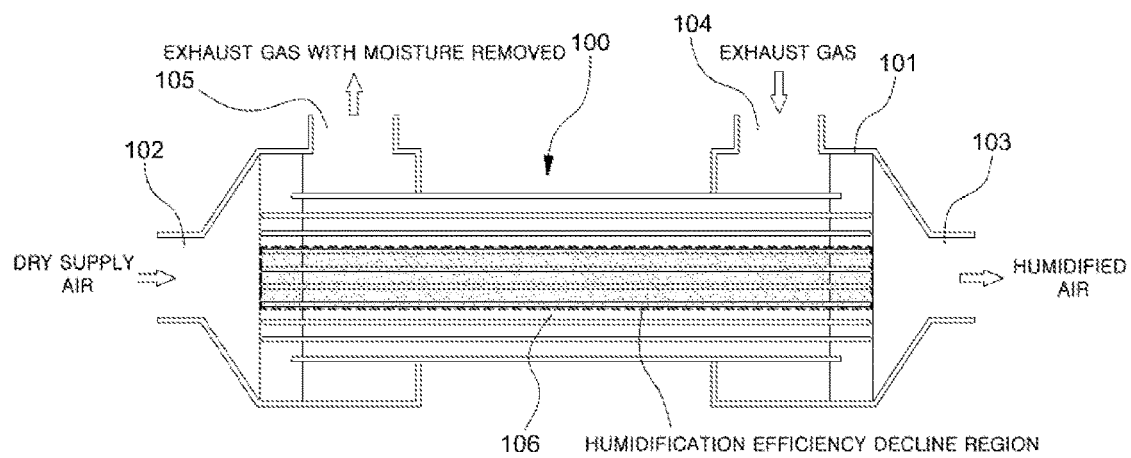

FIG. 6 illustrates an exemplary device for adjusting a hollow fiber membrane density for an exemplary membrane humidification device of a fuel cell according to a sixth exemplary embodiment of the present invention.

A division module 110 according to the sixth example of the present invention may be configured in the same manner as the division module of the above-described second example, but the third division module 113 may be arranged in a direction perpendicular the first division module 111 as described in the fifth exemplary embodiment.

Accordingly, the first division module 111 may be provided as a hollow case structure having a semi-circular cross-section in which a circle may be laterally bisected, the second division module 112 may be provided as a hollow case structure in which a circle may be divided into four sections along the vertical direction and may be equally arranged along the lateral direction, and the third division module 113 may be provided as a hollow case structure having a semi-circular cross-section in which a circle may be vertically bisected.

As such, since the space in the first division module 111 is divided into two sections and the spacing between the hollow fiber membranes is wide, the density may be low. In addition, since the space in the second division module 112 is divided into four sections and the spacing between the hollow fiber membranes is less than the first division module, the density may increase. Further, since the space in the third division module 113 is divided into two sections and the spacing between the hollow fiber membranes is as wide as the first division module 111, the density may decrease again.

According to the sixth exemplary embodiment of the present invention, changes in differential pressure and velocity of the wet air flowing around the hollow fiber membranes for each of the first to third division modules 111, 112, and 113 may be induced by increasing and then decreasing the density in the length direction the hollow fiber membranes 106 for each of the first to third division modules 111, 112, and 113. In particular, since the third division module 113 is arranged in a direction perpendicular to the first and second division modules 111 and 112, the flow direction of the wet air is induced such that the flow direction in the third division module 113 may change. As consequence, the humidification efficiency of the dry air may be improved by allowing the wet air to uniformly penetrate to the central part of the hollow fiber membrane bundle in each division module.

The invention has been described in detail with reference to various exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A device for adjusting a hollow fiber membrane density for a membrane humidification device of a fuel cell system, comprising:
   a hollow housing in which a dry air supply port and a discharge port for discharging the humidified dry air are formed on both sides, a wet air inlet is formed at a first end portion, and a wet air outlet is formed at a second end portion;
   a plurality of division modules that contact wet air and are mounted to an interior of the housing; and
   hollow fiber membranes disposed in an interior of each of the division modules,
   wherein the division modules are fixedly mounted to an inner space of the wet air inlet side of the housing, an inner space of the wet air outlet side, and a space between the wet air inlet and outlet and each of division modules is divided into various numbers of sections.

2. The device of claim 1, wherein the division modules includes:
   a first division module that is divided into two sections and is mounted to the interior of the wet air inlet side of the housing;
   a second division module that is divided into four sections and is mounted to a space between the wet air inlet and the outlet of the housing; and
   a third division module that is divided into six sections and is mounted to the interior of the wet air outlet side of the housing.

3. The device of claim 2, wherein the first, second, and third division modules are configured as one cross-sectional shape among polygonal cross-sectional shapes, while having a structure that is open in a lateral direction to cause the hollow fiber membranes having a bundle to form a pass.

4. The device of claim 2, wherein a wet air induction aperture is formed through four-side wall surfaces of the first division module and the third division module.

5. The device of claim 2, wherein the first division module is a hollow case structure having a semi-circular cross-section in which a circle is laterally bisected, the second division module is a hollow case structure in which a circle is divided into four sections along a vertical direction and is equally arranged along a lateral direction, and the third division module is a hollow case structure in which a circle is divided into six sections along the vertical direction and is equally arranged along the lateral direction.

6. The device of claim 2, wherein the first division module is a hollow case structure having a square cross-section in which a rectangle is laterally bisected, the second division module is a hollow case structure in which a rectangle is divided into four sections along the vertical direction and is equally arranged along the lateral direction, and the third division module is a hollow case structure in which a rectangle is divided into eight sections along the vertical direction, and is equally arranged along the lateral direction.

7. The device of claim 2, wherein the first division module is a hollow case structure having a semi-circular cross-section in which a circle is laterally bisected, the second division module is a hollow case structure in which a circle is divided into four sections along the vertical direction and is equally arranged along the lateral direction, and the third division module is a hollow case structure in which a circle is divided into six sections along the lateral direction and is equally arranged along the vertical direction.

8. The device of claim 1, wherein the division module includes:
   a first division module that is divided into two sections and is mounted to the interior of the wet air inlet side of the housing;
   a second division module that is divided into four sections and is mounted in a space between the wet air inlet and the outlet of the housing; and
   a third division module that is divided into two sections and is mounted to the interior of the wet air outlet side of the housing.

9. The device of claim 8, wherein the first, second, and third division modules are configured as one cross-sectional shape among the polygonal cross-sectional shapes, while having a structure that is open in the lateral direction to cause the hollow fiber membranes having a bundle to form a pass.

10. The device of claim 8, wherein a wet air induction aperture is formed through wall surfaces of four-sides of the first division module and the third division module.

11. The device of claim 8, wherein the first division module is a hollow case structure having a semi-circular cross-section in which a circle is laterally bisected, the second division module is a hollow case structure in which a circle is divided into four sections along the vertical direction and is equally arranged along the lateral direction, and the third division module is a hollow case structure having a semi-circular cross-section in which a circle is laterally bisected.

12. The device of claim 8, wherein the first division module is a hollow case structure having a square cross-section in which a rectangle is laterally bisected, the second division module is a hollow case structure in which a rectangle is divided into four or more sections along the vertical direction and is equally arranged along the lateral direction, and the third division module is a hollow case structure having a square cross-section in which a rectangle is laterally bisected.

13. The device of claim 8, wherein the first division module is a hollow case structure having a semi-circular cross-section in which a circle is laterally bisected, the second division module is a hollow case structure in which a circle is divided into four sections along the vertical direction and is equally arranged along the lateral direction, and the third division module is a hollow case structure having a semi-circular cross-section in which a circle is vertically bisected.

14. The device of claim 1, wherein a support step forms a joint groove to fasten one end portion of each division module in a fitting manner and is formed integrally on an inner-diameter surface of the housing.

15. A fuel cell system comprising a device of claim 1.

16. A vehicle comprising a fuel cell system of claim 15.

* * * * *